United States Patent Office 3,512,638
Patented May 19, 1970

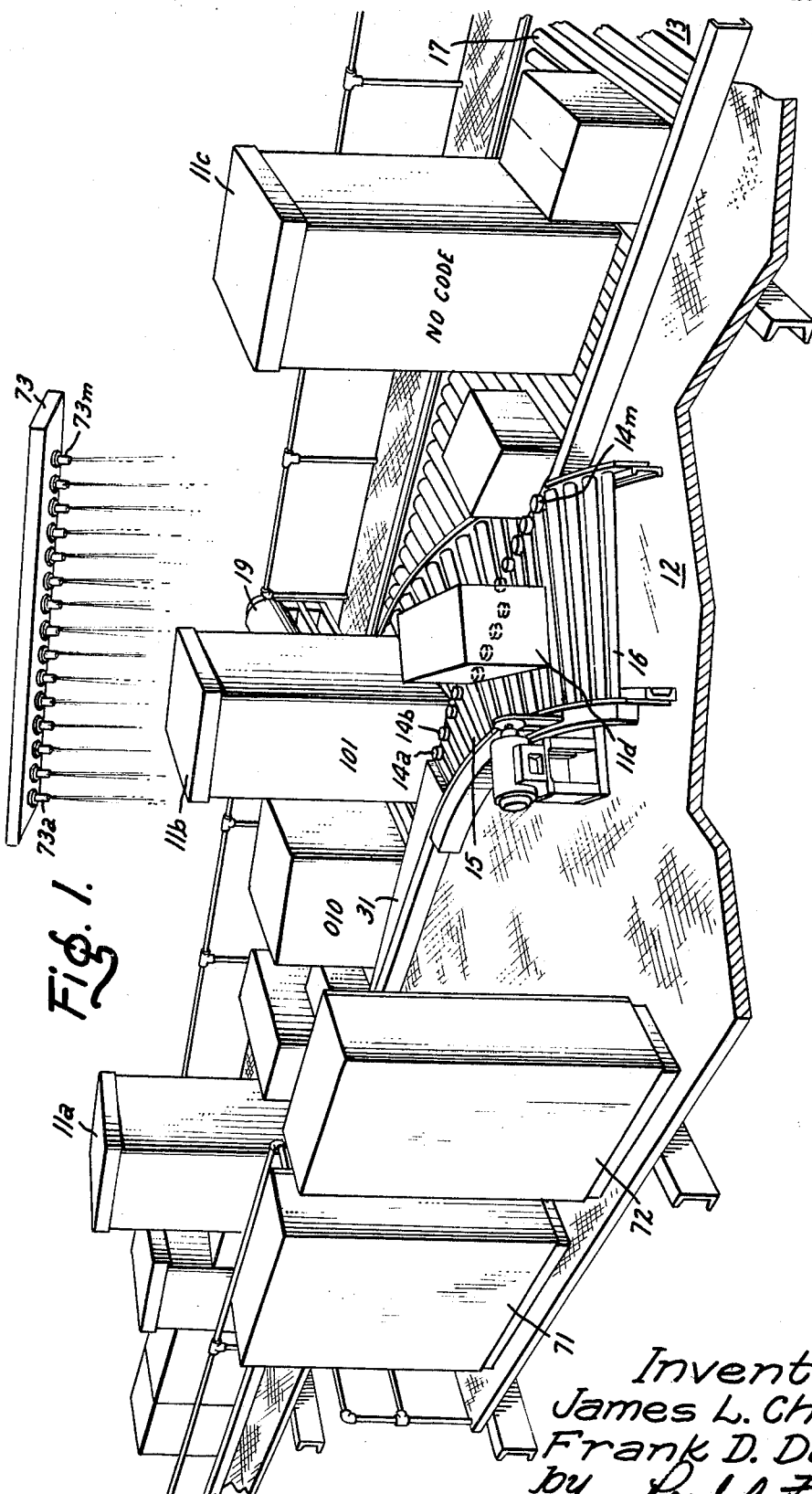

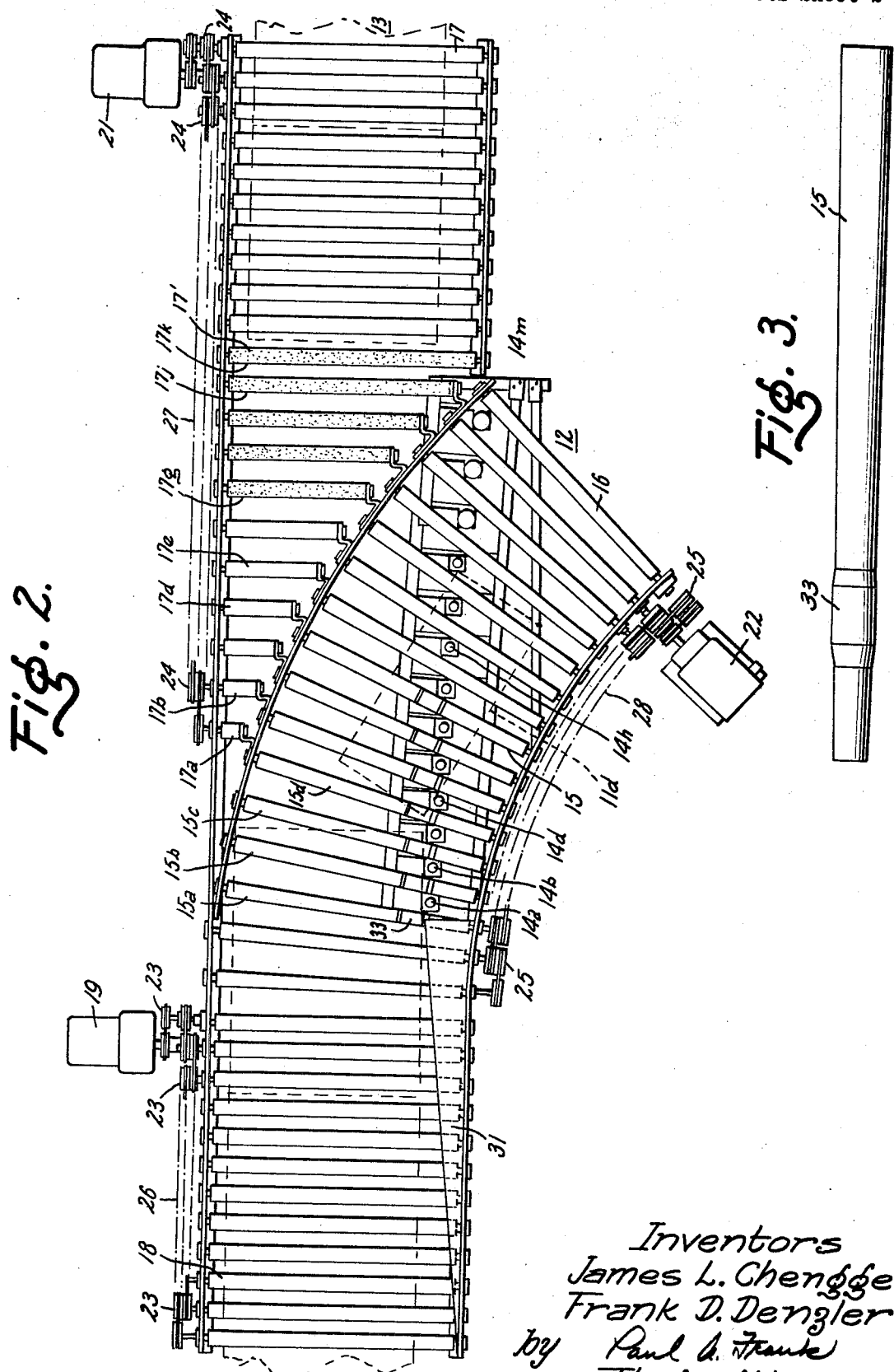

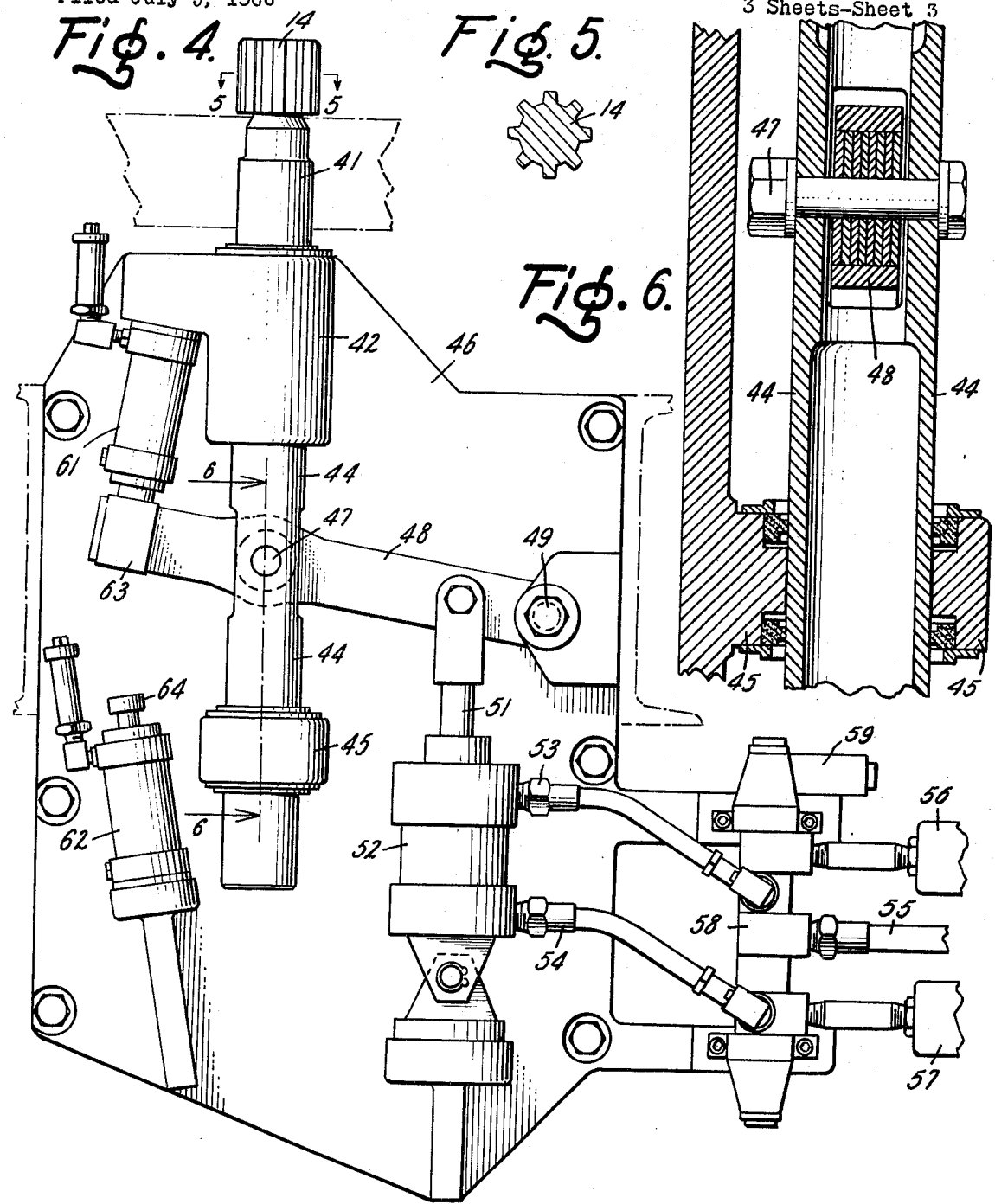

3,512,638
HIGH SPEED CONVEYOR SORTING DEVICE
James L. Chengges, Broomall, Pa., and Frank D. Denzler, Jeffersonville, Ind., assignors to General Electric Company, a corporation of New York
Filed July 5, 1968, Ser. No. 742,806
Int. Cl. B07c *3/06;* B65g *47/54*
U.S. Cl. 209—74          23 Claims

ABSTRACT OF THE DISCLOSURE

A high speed conveyor sorting device comprised by a first conveyor path formed by a first set of closely-spaced aligned first rollers and at least a second conveyor path comprised by a second set of closely-spaced aligned second rollers interposed with the first rollers and coacting with at least a portion of the first rollers to form a second conveyor path different from the first path. A plurality of diverter pins are disposed between the rollers for selectively diverting objects from the first conveyor path to the second conveyor path and individual diverter pin actuating means are provided for selectively raising and lowering the diverter pins individually to thereby selectively divert objects from the first conveyor path to the second conveyor path. Both the first and second sets of rollers are individually power driven at high speeds with the rollers comprising a part of at least one of the conveyor paths being tapered from one end to the other to cause objects traveling therealong to follow normally a curved path with the diverter pins in the lowered position. Certain of the rollers in the vicinity of the diverter pins are provided with a raised enlarged portion adjacent the diverter pins to prevent stoppage of cartons processed through the conveyor sorting device while the diverter pins are in the raised position. Additionally, at least part of the rollers of at least one of the conveyor paths leaving the diverter pin area of the conveyor sorting device are provided with high friction surfaces. Further, at least one of the conveyor paths forms an essentially straight line between the input and the output of the area containing the diverter pins, and the diverter pins are arrayed in a generally curved line relative to the straight line formed by the said one conveyor path. The diverter pins may be individually rotated at speeds corresponding to that of the rollers and the tops of the diverter pins engaged by objects transported along the conveyor sorting device while the diverter pins are raised may be knurled to facilitate transport of the objects past the raised diverter pins. Carton viewing and control means are provided which are comprised by a code reader and an electro-optical scanning arrangement for classifying cartons passing into the high speed conveyor sorting device into different categories determined by code markings and dimensions, and thereafter controlling the sorting operation of the high speed conveyor sorter in accordance with the information thus derived at a very high speed.

This invention relates to a new and improved high speed conveyor sorting device.

More particularly, the invention relates to a high speed conveyor sorting device of the type for high speed sorting a number of cartons transported along a common supply conveyor into at least two different classifications, and for transporting the sorted cartons away from the sorting area along at least two different high speed conveyor paths for supply to at least two differently classified receiving areas.

In modern warehousing systems utilizing high speed conveyors for transporting cartons containing goods to be distributed to different warehouse storage areas, distribution points, etc., there is a need to separate off from a master or mainline conveyor path certain cartons which are to be sorted out and diverted to a particular warehouse storage area, distribution point, etc. Thus, as the cartons are transported down a mainline conveyor path (which itself may comprise a branch or sub-mainline of a larger system) different classifications or categories of cartons may be sorted out and diverted to their particular assigned warehouse storage area. Needless to say that the further down the line one proceeds in such a system from the source of supply of cartoned goods, the simpler the problem of classification or sorting the cartons becomes. Conversely, the closer a sorting area is to the source of supply of cartoned goods, the more difficult the problem becomes. This is believed apparent from the fact that there are more cartoned goods to be sorted at such central points than is required at subsequent points. This condition establishes the corollary requirement that sorting devices used at such central points operate at extremely high speeds in order to process the large number of cartons that are required to pass through the central sorting device, if the conveyor system is to operate at reasonable speeds at points further along the system. It is also desirable that the conveyor sorting device used at such central points be capable of processing cartons having widely different sizes, configurations and weights at high speeds.

The conveyor sorting devices employed heretofore in automatic warehouse systems, have not been entirely satisfactory for use at such central points due to their low speed of processing. One of the prior art conveyor sorting devices known as an "alligator jaw" arrangement, requires the use of a switchable unit in the conveyor line which shifts its output between two inputs of a pair of receiving lines in much the same fashion as a railroad track is switched from one set of tracks to a second different set of tracks. Hence, the term "alligator jaw" switching arrangement. However, the mass and inertias associated with such switching arrangements, dictates its use with only low speed sorting requirements. In order to provide higher speed sorting devices the present invention was devised.

It is therefore a primary object of the invention to provide a new and improved high speed conveyor sorting device intended primarily for use at central processing (sorting) locations in the conveyor system of an automatic warehouse where high speed sorting is required, but which also is usable at less critical points in the system where the need for high speed sorting is not required.

A further object is to provide such a high speed conveyor sorting device that is capable of high speed sorting of cartons having widely different shapes, sizes and weights.

Another object of the invention is the provision of a high speed conveyor sorting device utilizing a plurality of selectively movable diverter pins that have low mass and inertia, and hence can be selectively raised and lowered between the rollers of a conveyor at a high speed to accomplish high speed sorting of cartoned goods passing through the conveyor sorting device.

Still another object of the invention is the provision of a high speed conveyor device having the above characteristics which employs a plurality of diverter pins arranged in a generally curved line having the rollers in the vicinity of the diverter pins provided with an enlarged raised portion adjacent the pins to prevent stoppage of cartons transported through the conveyor sorting device while the pins are in the raised position, and wherein at least part of the rollers of one of the conveyor paths leaving the diverter pin area of the conveyor sorting device are provided with high friction surfaces.

A still further object of the invention is the provision of a high speed conveyor sorting device of the above type which includes carton viewing and control means comprised by a code reader and an electro-optical scanning arrangement for classifying cartons passing into the high speed conveyor sorting device into different categories determined by code markings and dimensions, and thereafter controlling the sorting operation of the high speed sorter in accordance with the information thus derived at a very high speed.

In practicing the invention, a new and improved high speed conveyor sorting device is provided which includes a conveyor transfer mechanism having a first conveyor path comprised by a first set of closely-spaced aligned first rollers. At least a second conveyor path is provided which is comprised by a second set of closely-spaced aligned second rollers interposed with the first rollers and coacting with at least a portion of the first rollers to form a second conveyor path different from the first conveyor path. A plurality of diverter pins are disposed between the rollers for selectively diverting objects from the first conveyor path to the second conveyor path. Individual diverter pin actuating means are provided for selectively raising and lowering the diverter pins individually to thereby selectively divert objects from the first conveyor path to the second conveyor path. The first and second sets of rollers are individually power driven at high speeds, and the rollers comprising a part of at least one of the conveyor paths are tapered from one end to the other to cause objects traveling therealong to follow normally a curved path with the diverter pins in the lowered position. The rollers in the vicinity of the diverter pins are provided with a raised enlarged portion adjacent the diverter pins to prevent stoppage of the cartons processed through the conveyor sorting device while the diverter pins are in the raised position. At least part of the rollers of at least one of the conveyor paths leaving the diverter pin area of the conveyor sorting device are provided with high friction surfaces. At least one of the conveyor paths forms an essentially straight line between the input and output of the area containing the diverter pins, and the diverter pins are arrayed in a generally curved line relative to the straight line formed by the straight line conveyor path. The diverter pins may be individually rotated at a speed corresponding to that of the rollers and the tops of the diverter pins engaged by cartons transported along the conveyor sorting device while the diverter pins are in the raised position may be knurled to facilitate transport of the cartons past the raised diverter pins. Carton viewing and control means are provided which are comprised by code reader means for viewing code markings formed on the cartons and for deriving first control signals in accordance with such markings. The carton viewing and control means further includes an electro-optical scanning means for scanning the cartons prior to entering the conveyor sorting device and deriving timed second control signals in accordance with the dimensions of the cartons. The first and second control signals thus derived are supplied to the inputs of an electronic control circuit means which processes the first and second control signals and derives output control signals for controlling the diverter pin actuating means in accordance with the intelligence contained in the first and second control signals.

Other objects, features, and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIG. 1 is a schematic persepctive view of a high speed conveyor sorting device constructed in accordance with the invention, and illustrates a number of cartoned goods being transported through the device;

FIG. 2 is a plan view of the first and second conveyor paths comprising a part of the new and improved high speed conveyor sorting device;

FIG. 3 is a side view of a tapered roller, a number of which are used in forming one of the conveyor paths shown in FIG. 2 that provides a rounded or curved path of travel for articles supplied over this path with the diverter pins also comprising a part of the high speed conveyor sorting device being in the lowered position;

FIG. 4 is a side view of one of the diverter pins and its actuating mechanism comprising a part of the high speed conveyor sorting device, and shows the same in a raised position;

FIG. 5 is a cross sectional view of knurled top portion of an alternate form of diverter pin that can be used in the mechanism shown in FIG. 4; and FIG. 6 is a sectional view taken through plane 6—6 of FIG. 4 showing the manner of connection of the actuating arm to the movable piston that raises and lowers the diverter pin.

The high speed conveyor sorting device shown in FIG. 1 comprises a conveyor transfer mechanism for transferring cartoned objects such as those illustrate at 11a, 11b, 11c and 11d from a first mainline conveyor path indicated generally at 12 to a second divert conveyor path indicated at 13. It will be appreciated therefore that during operation, the high speed conveyor sorting device causes incoming cartoned goods such as those shown at 11a and 11b to follow a generally curved mainline first conveyor path 12 in the manner of the carton 11d or to follow a generally straight, divert second path 13 in the manner of the carton shown at 11c. In this manner, the multiplicity of cartons supplied to the input side of the high speed conveyor sorting device are caused to be classified into one of two different categories, and thereafter are transported to and along either one of the first or second conveyor paths 12 or 13. It should be understood that while only two output paths from the conveyor sorter device have been illustrated in the preferred form of the invention, it is possible in accordance with the teachings of the present invention to provide any desired number of such alternate paths leading from the conveyor sorting device, within the physical limits of the space available as a consequence of the size of the cartons to be transported, weight, speed of conveyance, etc. However, for the present purpose of illustration, it is believed that the embodiment of the invention shown in FIG. 1 will adequately disclose the principles of the invention to enable one skilled in the art to practice the same.

In order to cause the incoming cartons such as 11a and 11b to be transported along either the first conveyor path 12 or the second conveyor path 13, a plurality of diverter pins shown at 14a through 14m are disposed intermediate the first rollers 15 that comprise the first conveyor path 12. The diverter pins 14a through 14m may be selectively raised and lowered by a suitable diverter pin actuating means (to be described hereinafter) for selectively raising and lowering individually the diverter pins 14a through 14m. With the diverter pins 14a through 14m in the raised position, the cartons such as 11a and 11b will be caused to follow along a generally straight line path comprised by the second conveyor path 13 in the manner indicated by the carton 11c. With the diverter pins 14a through 14m in their lowered position, the incoming cartons such as 11a and 11b are caused to be transported along a generally curved path defined by the first conveyor path 12 in the manner shown by the carton 11d.

In order to cause the incoming cartons such as that shown at 11d to travel along the curved mainline first path 12, certain of the first rollers such as that shown at 15 are provided with a tapered configuration from one end to the other in the manner shown in FIG. 3 of the drawings. The tapered rollers 15 are located generally at the intersection of the first and second conveyor paths 12 and 13 in the vicinity of the diverter pin area. The arrangement is best seen in FIG. 2 of the drawings, wherein it is assumed that the diverter pins 14a through 14m are in their lowered position. With the diverter pins 14a through 14m in their lowered position, a carton such as that shown at 11d will inherently travel along the curved, mainline first conveyor path 12 due to the tapered configuration of the rollers such as 15 located at the point of intersection of the first and second conveyor paths 12 and 13. The output rollers such as those shown at 16 in the first conveyor path 12, and at 17 in the second conveyor path 13, have generally straight cylindrical configurations so that the cartons transported along these conveyor rollers travel in a substantially straight line.

All of the rollers such as 15, 16, and 17 comprising the first and second conveyor paths, as well as the rollers 18 comprising the input conveyor path to the conveyor sorting device and that in effect makes up part of both the first and second conveyor paths, are all individually power driven rollers. For this purpose, a "Varidyne" drive system manufactured and sold by the U.S. Varidyne Corporation may be provided for driving the individual rollers. Such a "Varidyne" roller drive system is comprised by a plurality of drive motors such as those shown at 19, 21, and 22. Each of the drive motors is coupled to and drives a plurality of individual sprocket wheels such as those shown at 23 for the drive motor 19, the sprocket wheels 24 for the drive motor 21 and the sprocket wheels 25 for the drive motor 22. Each of the drive motors drives the individual sprocket wheels associated therewith through suitable sprocket chains shown at 26 for the sprocket wheels 23, 27 for the sprocket wheels 24 and 28 for the sprocket wheels 25. In this manner, each of the roller elements such as 15 through 18 are individually power driven preferably at a high speed through the individual sprocket wheel connected thereto by its associated chain and drive motor. It might be noted, that in FIG. 2 of the drawing only the terminal sprocket wheels and drive chain for each portion of the "Varidyne" drive there shown is illustrated, with the remaining intermediate sprocket wheels and drive chains being illustrated only by phantom lines to facilitate illustration of the system.

As is best shown in FIG. 2 of the drawings, certain of the second rollers such as 17a through 17j of the second conveyor path 13 are foreshortened and are disposed in close proximity to certain of the rollers 15 and 16 of the first conveyor path 12, so that the two sets of rollers coact in transporting a carton over the straight, diverted conveyor path 13. It will also be seen that the sides of the second conveyor path 13 form an essentially straight line with respect to the input side comprised by the rollers 18 to the conveyor sorting device. It will also be seen that the diverter pins 14a through 14m are arrayed in a generally curved line relative to the straight line formed by the second conveyor path 13. The generally curved line formed by the array of diverter pins extends inwardly towards the center of the second conveyor path from the sides of the straight line with the leading pin 14a being disposed opposite the discharge end of an inwardly projecting guide 31. As a consequence of this arrangement, the leading edge of cartons being supplied to the input side of the conveyor sorting device over the rollers 18 is caused to be lead outwrdly by the guide 31 so that it can be made to avoid the first diverter pin 14a.

It should also be noted with respect to FIGS. 2 and 3 of the drawings, that certain of the rollers 15a through 15g in the vicinity of the diverter pins are provided with a raised enlarged portion shown at 33 in FIG. 3. This enlarged portion 33 of each of the rollers 15a through 15g is disposed adjacent the diverter pins 14a through 14g to prevent stoppage of the cartons being transported through the conveyor sorting device while the diverter pins 14α through 14m are in the raised position. As a consequence of this arrangement, cartons supplied to the conveyor sorting device with the pins 14 in the raised position, are caused to travel essentially along the straight line, diverted, second conveyor path 13 to the discharge point of that path.

In addition to the above characteristics, it should be noted that certain of the rollers 17g through 17k in the second, straight line, diverted conveyor path 13 which are located on the downstream or leaving side of the diverter pin area of the conveyor sorting device, are provided with high friction surfaces 17' such as might be obtained with a coating of plastisol or some other suitable high friction surface forming coating. With the conveyor sorting device thus constructed, cartons which are to be transported down the straight line, diverted, second conveyor line 13, do not tend to "nose in," hence preventing the leading corners of the cartons from tending to jam between the diverting pins 14. By reason of the inclusion of all three of the above briefly described features of construction, namely the location of the diverting pins in a curved path rather than a straight line path, the inclusion of the raised portions 33, and the coating of the leaving rollers 17g through 17k with a high friction surface, jamming of the cartons with the diverter pins 14a through 14m in the raised position is prevented.

One form of a suitable diverter pin actuating means for selectively raising and lowering each of the individual diverter pins 14a through 14m, is illustrated in FIG. 4 of the drawings. Referring to FIG. 4, it will be seen that a typical diverter pin 14 comprises a cylindrical cap that is rotatably mounted on an axially-reciprocal shaft member 41 supported in a slide bearing member 42 that in turn is mounted on a supporting base member 46. The shaft member 41 has an integral, lower, axially movable shaft portion 44 that also is slidably supported in a second bearing 45 secured to supporting plate 46. Reciprocally movable shaft portion 44 is also pivotally connected through a connecting pin 47 to a lever arm 48 that in turn is pivotally secured to the supporting base 46 by a pin 49. Lever arm 48 is reciprocated up and down by a pneumatically reciprocated connecting rod 51 that is driven up and down by a high pressure air piston (not shown) contained in a cylinder 52. High pressure air is supplied to opposite sides of the high pressure air piston contained in cylinder 52 from air supply lines 53 and 54 supplied from a common high pressure supply line 55. The lines 53 and 54 also serve to discharge air from opposite sides of the piston in air cylinder 52 through discharge lines 56 and 57, respectively, by means of a suitable valve mechanism 58 controlled by a solenoid actuated relay shown at 59.

In operation, the solenoid actuated relay 59 (which is controlled from a suitable control circuit to be described more fully hereinafter) causes the valve mechanism 58 to allow high pressure air from the common supply line 55 to be supplied to either the upper side of the air piston in cylinder 52 through the inlet line 53, or to be supplied to the lower side of the air piston through the supply line 54. Concurrently with this action, the valve mechanism 58 exhausts the opposite side of the cylinder 52 which is not connected to the air supply line 55 to an exhaust port through lines 56 or 57. Upon high pressure air supply line 55 being supplied to the lower side of air cylinder 52, the connecting rod 51 will be raised thereby raising lever arm 48 to the position shown and raising the diverter pin 14 into its upper or raised diverting position. Upon air from supply line 55 being supplied to the upper side of the air cylinder 52, the connecting rod 51 is lowered from the position shown thereby drawing lever arm 48 downwardly and lowering the diverter pin 14 to its lower non-diverting position. During this operation, suitable pneumatic cushioning devices shown at 61 and 62 cushion the up and down movement of the diverter pins. For this purpose, the free end of the lever arm 48 shown at 63 has a surface which engages the end of a plunger such as shown at 64, causing the pneumatic cushioning device 61 or 62 to slow or cushion the movement of the reciprocally movable shaft member 44 up and down. Pneumatic device 61 cushions the upward movement of shaft 44 and hence diverter pin 14, and pneumatic device 62 cushions the downward movement of the shaft 44.

FIG. 5 of the drawings is a cross sectional view of an alternate configuration for the upper cup-shaped portion of diverter pin 14 which is engaged by cartons moving along the conveyor sorting device while the diverter pins 14 are in the raised position. As will be seen from FIG. 5, the diverter pins preferably may have a knurled or notched cross section. This knurled or notched cross section as a consequence of the rotation of the diverter pins 14 will serve to pull or push the ends of any cartons that may tend to be jammed between the diverter pin away from a jamming condition so as to facilitate transport of the cartons past the raised diverter pins. Rotation of the knurled pins can be accomplished by suitable small size drive motors mounted on and reciprocal with the upper shaft 41.

Referring again to FIG. 1 of the drawings, the high speed conveyor sorting device is completed by carton viewing and control means for controlling the selective actuation of the diverter pins 14 by the pin actuating mechanism shown in FIGS. 4 through 6. This carton viewing and control means is comprised by a commercially available sequential code reader shown at 71. The code reader 71 may comprise a conventional, photo-electric sequential code reader such as the Specialty Control Model No. 357602SA102B1 manufactured and sold by the Specialty Control Department of the General Electric Company located at Waynesboro, Va. This code reader reads eight (8) different combinations of a three (3) bit binary code or the absence of any code, and develops output first control signals in accordance with such code markings (or their absence). The code markings are read by a suitable photo-sensor that is operated by sensing the difference in light level in the presence or absence of codes.

The carton viewing and control means also includes static electronic control circuit means shown at 72 which has the first output signals developed by the code reader 71 supplied thereto as one of the inputs. Additional inputs to the electronic control circuit means 72 are supplied from an array of electro-optical scanning devices shown at 73. In one typical installation there are in fact thirteen (13) photo-electric coaxial scanners (one for each of the diverter pins 14) which are installed nine feet above the diverter section of the high speed conveyor sorting device and are spaced apart by a distance of six inches between centers. Associated retro-reflectors are located below and between the conveyor rolls (which are spaced apart a corresponding distance) for establishing a light beam path between the photo-electric scanners and the retro-reflectors. It will be noted that as a carton passes through the high speed conveyor sorting device, the carton will intercept each of the thirteen light beam paths sequentially so that in effect the photo-electric scanners 73 serve to establish the location of each carton with respect to each of the diverter pins 14 as the carton is transported through the high speed conveyor sorting device.

The output signals from all thirteen photo-electric scanners 73 are supplied to the electronic control circuit means 72 along with the first control signals from the code reader 71 respresentative of the code markings (or the absence thereof) on each carton. The electronic control circuit means 72 then serves to process the first and second control signals supplied thereto from the code reader means 71 and the photo-electric scanning means 73, and to derive output control signals in accordance with the intelligence contained in these first and second input control signals. For a more detailed description of the electronic control circuit means 72, and the manner of its operation reference is made to a copending United States application Ser. No. 742,721 entitled "Static Electronic Control for Conveyor Sorting Device—Derwood P. Littlefield, inventor (General Electric patent docket 14D-4091) filed concurrently with this application.

The output control signals derived from the electronic control circuit means 72 are then applied to and control the individual diverter pin actuating means for selectively raising and lowering the diverter pins 14 individually to thereby selectively divert objects from the first conveyor path to the second conveyor path. Accordingly, it will be appreciated that the electronic control circuit means 72 will derive thirteen output signals which are separately supplied to the individual actuating relay windings 59 of each of the diverter pin actuating mechanisms (such as that shown in FIG. 4) for controlling diverter pins 14a through 14m. It should be noted, that while thirteen diverter pins 14a through 14m and their associated thirteen photo-electric scanners have been employed in the preferred embodiment of the invention herein described, the invention is in no way limited to the use of this particular number of diverter pins and associated photo-electric scanners. The numbers of such pins and associated photo-electric scanners can be determined by the individual needs of each installation and if desired fewer or more pins and associated photo-electric scanners can be provided. The same observation is true with respect to the eight different codes provided for the several cartons being processed. If desired, additional or fewer code numbers can be provided to expand or contract the classification of cartons being coded. Also, it might be noted that while a photo-sensor type of code reader has been employed in connection with the present embodiment of the invention, it is entirely feasible to develop such code information through other types of encoding and decoding devices such as those employing mechanical brush contacts with conductive paint, etc.

The high speed conveyor sorting device illustrated in FIGS. 1 through 6 of the drawings is designed to handle cartons from 18 inches to 72 inches in length, 16 to 42 inches in width and 8 to 90 inches in height. The cartons being processed may weigh between 25 pounds to 900 pounds and are handled at a conveyor speed of about 350 feet per minute with about 12 inches spacing between cartons. As the cartons on the conveyor are moved down the conveyor line into the area of the high speed sorting device, the code reader 71 will read all of the cartons to determine whether there is a presence of absence of a code, and will provide a "through" or "divert" first control signal to the static electronic control circuit means 72 in response to the presence or absence of code markings on the container. If the code reader 71 reads a "through" code, a "through" memory element is turned on in the static electronic control circuit 72. As this particular carton progresses to the number one coaxial scanner 73a it breaks the reflected light between the scanner and its retro-reflector located beneath the scanner. This results in providing the electronic control circuit 72 with an output signal from the number one photo-electric scanner 73a which turns on a photo-electric memory module in electronic circuit 72.

The combinatoon of the "through" memory signal and the signal from the number one photo-electric scanner 73a results in turning on a special "through" AND logic element in the control circuit which will cause a "through" control signal to be applied to the actuating relay winding 59 of the actuating mechanism of the first diverter pin 14a, and a similar "through" signal will be applied to the actuating mechanisms of the remaining pins 14b–14m. In the arrangement shown in the drawings, the "through" path is formed by having the diverter pins 14 in the lowered position so that the carton will travel the curved, mainline first conveyor path 12 in departing from the conveyor sorter.

The diverter pins 14a–14m will then remain in the down or lowered position, until such time that a carton comes along which is uncoded, or contains a code indicating that the carton is to be diverted to the straight line second conveyor path. Upon this occasion, as the carton with the divert code (or no code) progresses to the number one coaxial photo-electric scanner, and breaks its reflected light beam, the scanner sends a control signal to the number one photo-electric memory module in the electronic control circuit. The combination of divert memory signal and the photo-electric module memory turned on by the number one coaxial scanner 73a activates a special "divert" AND logic element that seals in the divert code memory signal. The output of this sealed AND logic element turns on a time delay module which then excites an AC output amplifier that sends 115 volt, 60 cycle current to operate the number one diverter pin relay 59 causing the number 14a diverter pin to be moved to its raised or upper position. The diverter pin 14a then will remain in the up or divert position until (1) a "through" code has been read by the code reader for a succeeding carton and resets the code reader memory module, and (2) the first carton's trailing edge passes out of the line of view of the number one photo-electric scanner light beam thereby permitting the number one photo-electric scanner memory module to reset. Both of these conditions must be satisfied before the number one diverter pin 14a can return to its lower or down position. The photo-electric and static memory circuits for the remaining 12 diverter pins 14b through 14m operate in the same manner as described above for the No. 1 diverter pin 14a with the exception that the AND memory element for each successive diverter pin receives a signal from the preceding photo-electric module memory element rather than from the code reader memory module.

It will be appreciated therefore that the appearance of a carton calling for "divert" processing will cause the first diverter pin 14a to be raised to its upper position, and the raising of the first diverter pin will have a chain reaction that will raise each of the following Nos. 2 through 13 diverter pins 14b through 14m as the carton proceeds through the intersection of the conveyor sorting device. It is to be noted that all of the diverter pins will remain in the raised position until such time that a carton comes along calling for a "through" pathway treatment. Upon this occurrence, the system will operate to lower the diverter pins and allow the carton to travel the curved, mainline first conveyor pathway out of the sorting area. In a similar manner, once the diverter pins have been lowered, they will remain in the lowered position until a carton coming through the conveyor system calls for the "divert" treatment. In this manner, cycling up and down of the diverter pins 14a through 14m is minimized thereby prolonging the operating life of the equipment and improving its reliability. The manner in which this is accomplished will be better appreciated from a detailed study of the above referenced copending Littlefield application Ser. No. 742,721 (General Electric patent docket 14D–4091). Reliability of operation is also improved greatly by the extremely low mass and low inertia of the diverter pins 14 which readily may be raised or lowered in response to commands from the electronic control circuit 72 in advance of passage of a carton being processed past the diverter pins. As a consequence of this low mass and inertia, smaller components requiring less power and expending less energy can be employed in fabricating the conveyor sorting device.

From the foregoing description it will be appreciated that the invention provides a new and improved high speed conveyor sorting device which is intended primarily for use in central processing (sorting) locations in an automatic conveyor system for automatic warehouses where high speed sorting is required. By reason of its characteristics, however, the high speed conveyor also may be used at less critical points in the system where slower processing speeds are adequate but where its relatively low cost makes it a desirable item for use. The high speed conveyor sorting device is capable of processing cartons having widely different sizes, shapes and weights, and can accomplish this processing at relatively high speeds. The new and improved high speed conveyor sorting device utilizes a plurality of selectively movable low mass, low inertia diverter pins which readily can be selectively raised and lowered between the rollers of the conveyor at high speed to accomplish high speed sorting of cartoned goods passing through the sorting device. These characteristics are made possible by arranging the diverter pins in a generally curved line and having the rollers in the vicinity of the diverter pins provided with an enlarged raised portion adjacent the pins to prevent stoppage of cartons transported through the conveyor device while the pins are in the raised position. Additionally, at least part of the rollers of one of the conveyor paths leaving the diverter pin area are provided with high friction surfaces to facilitate moving cartons through the sorting device. The sorting device includes carton viewing and control means comprised by a code reader and an electro-optical scanning arrangement, and which coacts with an electronic control circuit for classifying cartons passing into the high speed conveyor sorting area into different categories determined by code markings on the cartons and the dimensions of the cartons and thereafter controlling the operation of the high speed sorting device in accordance with the information thus derived.

Having described one embodiment of a new and improved high speed conveyor sorting device constructed in accordance with the invention, it is believed obvious that other modifications and variations of the invention are possible in the light of the above teachings. It is therefore to be understood that changes may be made in the particular embodiment of the invention described which are within the full intended scope of the invention as defined by the appended claims.

What we claim as new and desire to secure by Letters Patent of the United States is:

1. A new and improved high speed conveyor sorting device including in combination a conveyor transfer mechanism having a first conveyor path comprised by a first set of closely-spaced aligned first rollers, at least a second conveyor path comprised by a second set of closely-spaced aligned second rollers interposed with the first rollers and coacting with at least a portion of the first rollers to form a second conveyor path different from the first path, a plurality of diverter pins disposed between said rollers for selectively diverting objects from the first conveyor path to the second conveyor path, and individual diverter pin actuating means for selectively raising and lowering the diverter pins individually to thereby selectively divert objects from the first conveyor path to the second conveyor path.

2. A high speed conveyor sorting device according to claim 1 wherein both the first and second sets of rollers are individually power driven at high speeds.

3. A high speed conveyor sorting device according to claim 1 wherein the rollers comprising a part of at least one of said conveyor paths are tapered from one end to the other to cause objects traveling therealong to follow normally a curved path with the diverter pins in the lowered position.

4. A high speed conveyor sorting device according to claim 1 wherein the rollers in the vicinity of the diverter pins are provided with a raised enlarged portion adjacent the diverter pins to prevent stoppage of the cartons processed through the conveyor sorting device while the diverter pins are in the raised position.

5. A high speed conveyor sorting device according to claim 1 wherein at least part of the rollers of at least one of the conveyor paths leaving the diverter pin area of the conveyor sorting device are provided with high friction surfaces.

6. A high speed conveyor sorting device according to claim 1 wherein at least one of the conveyor paths forms an essentially straight line between the input and output of the area containing the diverter pins, and the diverter pins are arrayed in a generally curved line relative to the straight line formed by said one conveyor path.

7. A high speed conveyor sorting device according to claim 6 wherein the generally curved line formed by the array of diverter pins extends inwardly from the sides of the straight line conveyor path and an inwardly extending guide positioned on the side of the conveyor path on the input side of the diverter pins properly locates incoming cartons with respect to the diverter pins.

8. A high speed conveyor sorting device according to claim 1 wherein the rollers in the vicinity of the diverter pins are provided with a raised enlarged portion adjacent the diverter pins to prevent stoppage of the cartons traveling along the device while the diverter pins are in the raised position, and wherein at least one of the conveyor paths forms an essentially straight line between the input and output of the area containing the diverter pins, and the diverter pins are arrayed in a generally curved line relative to the straight line formed by said one conveyor path.

9. A high speed conveyor sorting device according to claim 1 wherein the rollers in the vicinity of the diverter pins are provided with a raised enlarged portion adjacent the diverter pins to prevent stoppage of the cartons traveling along the device while the diverter pins are in the raised position, and wherein at least part of the rollers in at least one of the conveyor paths subsequent to the diverter pins are provided with high friction surfaces.

10. A high speed conveyor sorting device according to claim 9 wherein at least one of the conveyor paths forms an essentially straight line between the input and output of the area containing the diverter pins, and the diverter pins are arrayed in a generally curved line relative to the straight line formed by said one conveyor path.

11. A high speed conveyor sorting device according to claim 10 wherein both the first and second rollers are individually power driven at a high speed.

12. A high speed conveyor sorting device according to claim 11 wherein the rollers comprising a part of at least one of said conveyor paths are tapered from one end to the other to cause objects traveling therealong to follow a curved path.

13. A high speed conveyor sorting device according to claim 12 wherein the diverter pins are individually rotated at a speed corresponding to that of the rollers and the tops of the diverter pins engaged by objects transported along the conveyor sorting device while the diverted pins are raised are knurled to facilitate transport of the objects past the raised diverter pins.

14. A high speed conveyor sorting device according to claim 12 further including carton viewing and control means comprised by code reader means for viewing code markings formed on the cartons and deriving first control signals in accordance with such code markings and electro-optical scanning means for scanning the cartons prior to entering the conveyor sorting device and deriving timed second control signals in accordance with the dimensions of the cartons, and electronic control circuit means having the input thereof coupled to the outputs from the code reader means and the electro-optical scanning means and the output thereof coupled to and controlling the operation of the diverter pin actuating means, the electronic control circuit means serving to process the first and second control signals supplied thereto from the code reader means and the electro-optical scanning means and deriving output control signals for controlling the diverter pin actuating means in accordance with the intelligence contained in the first and second control signals.

15. A new and improved high speed conveyor device according to claim 1 wherein the first conveyor path comprised by the first rollers includes a number of rollers which are tapered from one end to the other to cause objects traveling therealong to follow normally a curved mainline path with the diverter pins in the lowered position, the second conveyor path forms an essentially straight line diverted path with respect to the input to and output from the diverter pin area, and the diverter pins are arrayed in a geneally curved line relative to the straight line formed by the second conveyor path whereby objects transported through the high speed sorting device are caused normally to follow along the curved mainline first conveyor path with the diverter pins in the lowered position and are caused to follow along the straight line diverted path with the diverter pins in the raised position.

16. A high speed conveyor sorting device according to claim 15 wherein both the first and second sets of rollers are individually power driven at high speeds.

17. A high speed conveyor sorting device according to claim 15 wherein certain of the mainline first rollers including the portion thereof which are tapered in the vicinity of the diverter pins are provided with a raised enlarged portion adjacent the diverter pins to prevent stoppage of the cartons traveling along the sorting device while the diverter pins are in the raised position.

18. A high speed conveyor sorting device according to claim 15 wherein the diverter pins are individually rotated at speeds corresponding to those of the rollers and the tops of the diverter pins engaged by objects transported along the conveyor sorting device while the diveter pins are raised are knurled to facilitate transport of the objects past the raised diverter pins.

19. A high speed conveyor sorting device according to claim 15 wherein at least part of the second rollers comprising the straight line diverted second conveyor path at a location immediately leaving the diverter pin area are provided with high friction surfaces.

20. A high speed conveyor sorting device according to claim 19 wherein certain of the mainline first rollers including the portion thereof which are tapered in the vicinity of the diverter pins are provided with a raised enlarged portion adjacent the diverter pins to prevent stoppage of the cartons traveling along the sorting device while the diverter pins are in the raised position, and both the first and second set of rollers are individually power driven at high speeds.

21. A high speed conveyor sorting device according to claim 20 wherein the diverter pins are individually rotated at speeds corresponding to those of the rollers and the tops of the diverter pins engaged by objects transported along the conveyor sorting device while the diverter pins are raised are knurled to facilitate transport of the objects past the raised diverter pins.

22. A high speed conveyor sorting device according to claim 20 further including carton viewing and control means comprised by code reader means for viewing code markings formed on the cartons and deriving first control signals in accordance with such code markings and electro-optical scanning means for scanning the cartons prior to entering the conveyor sorting device and deriving timed second control signals in accordance with the dimensions of the cartons, and electronic control circuit means having the input thereof coupled to the outputs from the code reader means and the electro-optical scanning means and the output thereof coupled to and controlling the operation of the diverter pin actuating means, the electronic control circuit means serving to process the first and second control signals supplied thereto from the code reader means and the electro-optical scanning means and deriving output control signals for controlling the diverter pin actuating means in accordance with the intelligence contained in the first and second control signals.

23. A high speed conveyor sorting device according to claim 1 further including carton viewing and control means comprised by code reader means for viewing code markings formed on the cartons and deriving first control signals in accordance with such code markings and electro-optical scanning means for scanning the cartons prior to entering the conveyor sorting device and deriving timed second control signals in accordance with the dimensions of the cartons, and electronic control circuit means having the input thereof coupled to the outputs from the code reader means and the electro-optical scanning means and the output thereof coupled to and controlling the operation of the diverter pin actuating means, the electronic control circuit means serving to process the first and second control signals supplied thereto from the code reader means and the electro-optical scanning means and deriving output control signals for controlling the diverter pin actuating means in accordance with the intelligence contained in the first and second control signals.

References Cited

UNITED STATES PATENTS

| 3,045,792 | 7/1962 | Greller | 193—36 |
| 3,138,238 | 6/1964 | De Good | 193—36 X |

RICHARD A. SCHACHER, Primary Examiner

U.S. Cl. X.R.

193—36; 198—31; 209—111.7